United States Patent
Lee et al.

(10) Patent No.: US 10,125,810 B2
(45) Date of Patent: Nov. 13, 2018

(54) BALL JOINT

(71) Applicant: ILJIN.CO.LTD., Gyeongju-si (KR)

(72) Inventors: Young-Chun Lee, Suwon-si (KR); Tae-Sung Kwon, Gyeongsangbuk-do (KR); Hyun-Woo Kim, Seoul (KR)

(73) Assignee: ILJIN.CO.LTD., Gyeongju-si (KR)

( * ) Notice: Subject to any disclaimer, the term of this patent is extended or adjusted under 35 U.S.C. 154(b) by 582 days.

(21) Appl. No.: 14/411,188

(22) PCT Filed: Mar. 20, 2013

(86) PCT No.: PCT/KR2013/002307
§ 371 (c)(1),
(2) Date: Dec. 24, 2014

(87) PCT Pub. No.: WO2014/003290
PCT Pub. Date: Jan. 3, 2014

(65) Prior Publication Data
US 2015/0322998 A1    Nov. 12, 2015

(30) Foreign Application Priority Data

Jun. 29, 2012 (KR) .................. 10-2012-0071109

(51) Int. Cl.
*F16C 11/06* (2006.01)
*B60G 7/00* (2006.01)
*F16F 1/393* (2006.01)

(52) U.S. Cl.
CPC ............. *F16C 11/06* (2013.01); *B60G 7/005* (2013.01); *F16C 11/0614* (2013.01);
(Continued)

(58) Field of Classification Search
CPC ............. F16C 11/0614; F16C 11/0671; Y10T 403/32729
See application file for complete search history.

(56) References Cited

U.S. PATENT DOCUMENTS 4,034,996 A * 7/1977 Manita ............... B60G 5/053
                                                    280/80.1
4,447,094 A * 5/1984 Trudeau ............. F16C 11/0666
                                                    384/145
(Continued)

FOREIGN PATENT DOCUMENTS

CN       2936810 Y      8/2007
CN     101108581 A      1/2008
(Continued)

OTHER PUBLICATIONS

Office Action in Chinese Application No. 201380034172.4 dated Feb. 19, 2016, 6 pages.
(Continued)

*Primary Examiner* — Matthieu F Setliff
(74) *Attorney, Agent, or Firm* — Marshall, Gerstein & Borun LLP (57) ABSTRACT

A ball joint may include a stud member having a spherical portion formed to be convex along an exterior circumference, a bearing member seated on an exterior circumference of the spherical portion and facilitating rotation of the stud member, an outer pipe provided at an outside of the bearing member, a seat member provided between and coupling the bearing member and the outer pipe, a pair of rubber ring members provided respectively at both sides of the spherical portion on the exterior circumference of the stud member, and a pair of outer ring members, each of the pair of outer ring members being coupled on an exterior circumference of each rubber ring member.

12 Claims, 9 Drawing Sheets

(52) U.S. Cl.
CPC .......... *F16C 11/0671* (2013.01); *F16F 1/393* (2013.01); *B60G 2204/416* (2013.01); *F16C 2326/05* (2013.01); *Y10T 403/32721* (2015.01)

(56) References Cited

U.S. PATENT DOCUMENTS

| | | | | |
|---|---|---|---|---|
| 4,483,569 | A * | 11/1984 | Smith | F16C 11/0614 384/145 |
| 4,553,760 | A | 11/1985 | Reed et al. | |
| 4,575,162 | A * | 3/1986 | Smith | F16C 11/0614 384/2 |
| 5,439,203 | A * | 8/1995 | Hadano | F16F 7/08 248/609 |
| 5,931,597 | A * | 8/1999 | Urbach | B60G 7/005 403/122 |
| 6,273,406 | B1 | 8/2001 | Miyamoto et al. | |
| 7,438,493 | B2 * | 10/2008 | Holmes | F16C 11/0614 403/134 |
| 8,783,702 | B2 | 7/2014 | Lee et al. | |
| 2007/0122232 | A1 * | 5/2007 | Buchner | F16C 11/0614 403/122 |
| 2011/0033227 | A1 * | 2/2011 | Kwon | B29C 45/14491 403/135 |
| 2012/0007329 | A1 * | 1/2012 | Hopson | B60G 7/005 280/124.134 |

FOREIGN PATENT DOCUMENTS

| | | |
|---|---|---|
| CN | 201712429 U | 1/2011 |
| JP | 06-129460 | 5/1994 |
| JP | 06-235417 | 8/1994 |
| JP | 07-293617 | 11/1995 |
| JP | 2009-108950 | 5/2009 |
| JP | 2009-293727 | 12/2009 |
| KR | 1020090039335 | 4/2009 |
| KR | 1020110136184 | 12/2011 |
| WO | WO-2011/158991 A1 | 12/2011 |

OTHER PUBLICATIONS

Supplemental European Search Report in EP Application No. 13809449 dated Jan. 11, 2016, 6 pages.
Search Report and Written Opinion in Application No. PCT/KR2013/002307 dated May 29, 2013.

* cited by examiner

BALL JOINT

TECHNICAL FIELD

The present invention relates to a ball joint, and more particularly, to a ball joint that connects a shaft member to an outer body.

BACKGROUND OF THE INVENTION

Generally, a ball joint is configured to rotatably connect a shaft member to an outer body and to absorb exterior impact applied to the shaft member. For example, the ball joint is used to a suspension system that prevents vibration or impact applied to an axle of a driving vehicle from a road from being directly transmitted to a vehicle body. Particularly, the ball joint is used to fix a stabilizer for preventing rolling of the vehicle or suspension link arms for maintaining angles of wheels of the vehicle.

If torsion or torque occurs at the shaft member such as the stabilizer or the suspension link arms due to external factors such as the rolling of the vehicle body or height changes of the wheels of the vehicle, a mounting apparatus such as the ball joint is configured to fix the shaft member to the outer body, that is the vehicle body.

Generally, the mounting apparatus includes a bushing for absorbing axial displacement and forward/rearward impact, and a bracket enclosing the bushing and coupled to the outer body. A rubber bushing provided with a rubber between a hollow inner pipe and a hollow outer pipe or a pillow ball joint including a spherical ball formed on a hollow shaft and a bearing enclosing the ball and being slidable on the ball is used as the bushing.

The rubber bushing is excellent in absorbing forward/rearward impact and restoring its original position, but has low rigidity because a gap in a radial direction is formed therein. On the contrary, the pillow ball joint has high rigidity because a gap in the radial direction is not formed, but is bad at restoring its original position.

Therefore, the pillow ball joints are not used at both sides of the shaft member, and the rubber bushing should be used at at least one side of the shaft member.

In addition, a lubricant is injected into the pillow ball joint so as to smoothen rotation of the bearing along the spherical ball. At this time, an additional sealing member is coupled to the pillow ball joint in order to prevent leakage of the lubricant to the outside. Therefore, manufacturing processes and production cost of the pillow ball joint may be increased.

CONTENTS OF THE INVENTION

Object to be Achieved

The present invention has been made in an effort to provide a ball joint having advantages of maintaining high rigidity and restoring its original position smoothly after a shaft member is twisted.

The present invention has been made in an effort to provide a ball joint having advantages of preventing leakage of a lubricant in the ball joint without an additional sealing member.

Means for Achieving the Object

In order to solve such problems, a ball joint according to an exemplary embodiment of the present invention may include a stud member having a spherical portion formed to be convex along an exterior circumference, a bearing member seated on an exterior circumference of the spherical portion and facilitating rotation of the stud member, an outer pipe provided at an outside of the bearing member, a seat member provided between and coupling the bearing member and the outer pipe, a pair of rubber ring members provided respectively at both sides of the spherical portion on the exterior circumference of the stud member, and a pair of outer ring members, each of the pair of outer ring members being coupled on an exterior circumference of each rubber ring member.

In addition, the rubber ring members may be fixedly coupled to the stud member.

In addition. the rubber ring members may be disposed apart from the seat member in an axial direction.

In addition, the rubber ring members may be disposed part from the seat member and the spherical portion in an axial direction.

In addition, the rubber ring members may be configured to cover sides of the outer ring members facing the outer pipe.

In addition, the rubber ring members may be configured to cover interior circumferential portions of sides of the outer ring members.

In addition, the rubber ring members may be provided separately from the stud member and may be fitted on the stud member.

In addition, inner ring members may be further included, wherein each of the inner ring members is coupled on an interior circumference of each rubber ring member.

In addition, a length of the outer pipe member may be longer than that of the bearing member.

In addition, the rubber ring members may be interference-fitted between the stud member and the outer pipe member.

In addition, the rubber ring members may be configured to cover sides of the inner ring members facing the spherical portion.

In addition, the rubber ring members may be disposed apart from the spherical portion.

In addition, stoppers protruded from ends of interior circumferences of the rubber ring members facing the spherical portion may be further included.

In addition, a lubricant may fill among the rubber ring members, the seat member, the bearing member and the stud member.

In addition, the outer pipe and the outer ring member may be assembled by being interference-fitted on an arm member.

In addition, lubrication spaces may be formed among the rubber ring members, the outer ring members, the bearing member, the seat member and the outer pipe, wherein the outer ring members are pushed to contact with the outer pipe and to be assembled to the arm member after the lubrication spaces are filled with the lubricants.

Effect of the Invention

A ball joint according to exemplary embodiments of the present invention may maintain high rigidity and restore to its original position after a shaft member is twisted.

In addition, lubricants in the ball joint are prevented from being leaked without an additional sealing member. Therefore, manufacturing process may be simplified and manufacturing cost may be curtailed.

In addition, rolling range of the ball joint that is rolled by twist of the shaft member may be controlled.

DETAILS FOR EXECUTING THE INVENTION

Hereinafter, exemplary embodiments of the present invention will be described so as to be easily embodied by those skilled in the art with reference to the accompanying drawings.

Such exemplary embodiments are just exemplary embodiments of the present invention and can be achieved in various forms. Therefore, it is to be understood that the scope of the present invention is not limited to the exemplary embodiments described herein.

Figure 1:
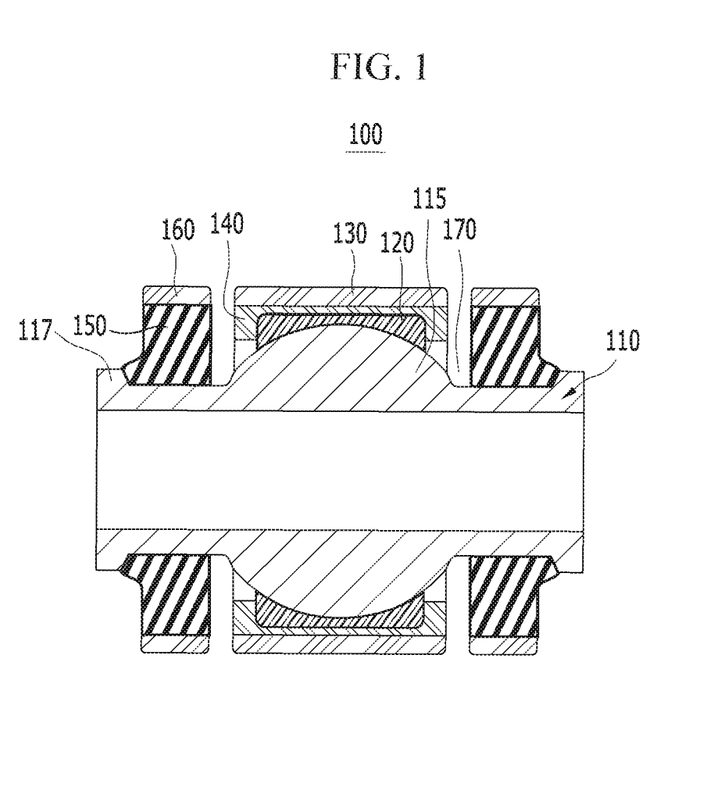
FIG. 1 is a cross-sectional view of a ball joint according to an exemplary embodiment of the present invention.
Figure 2:
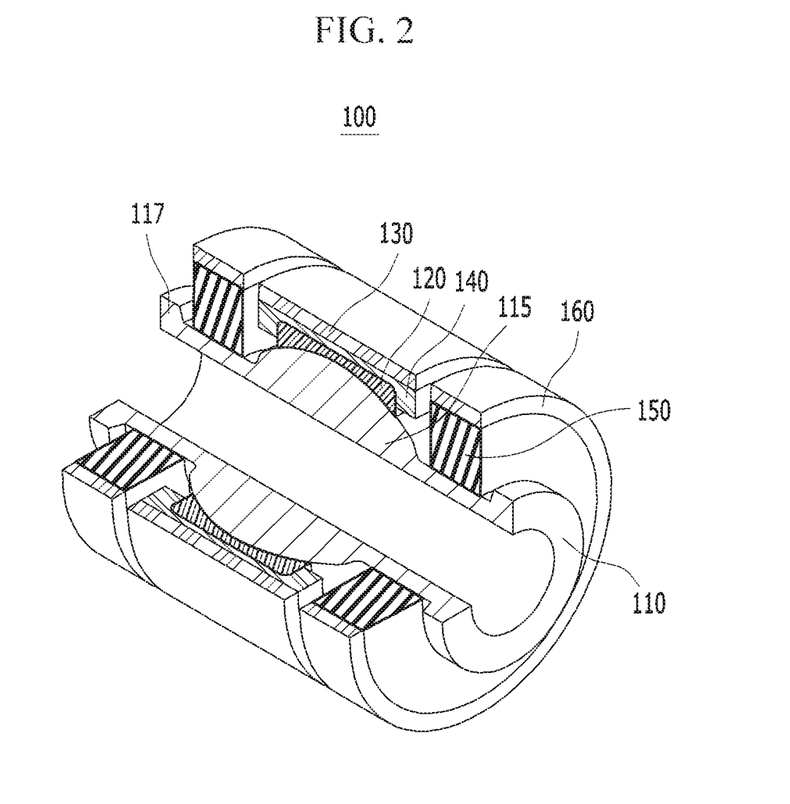
FIG. 2 is a cross-sectional perspective view of a ball joint according to an exemplary embodiment of the present invention.
Figure 3:
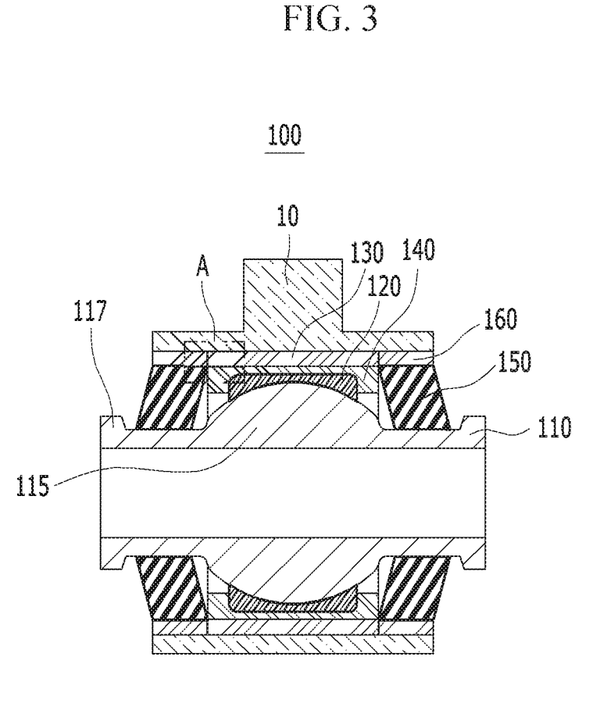
FIG. 3 is a cross-sectional view for illustrating a ball joint according to an exemplary embodiment of the present invention is mounted.
Figure 4:
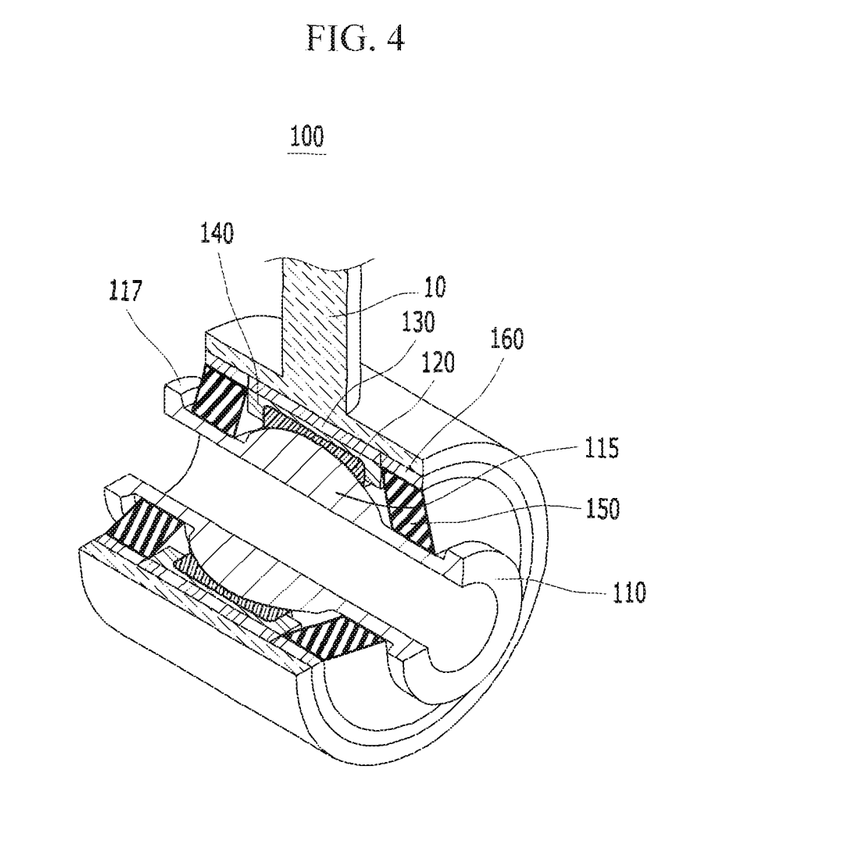
FIG. 4 is a cross-sectional perspective view for illustrating a ball joint according to an exemplary embodiment of the present invention is mounted.
Figure 5:
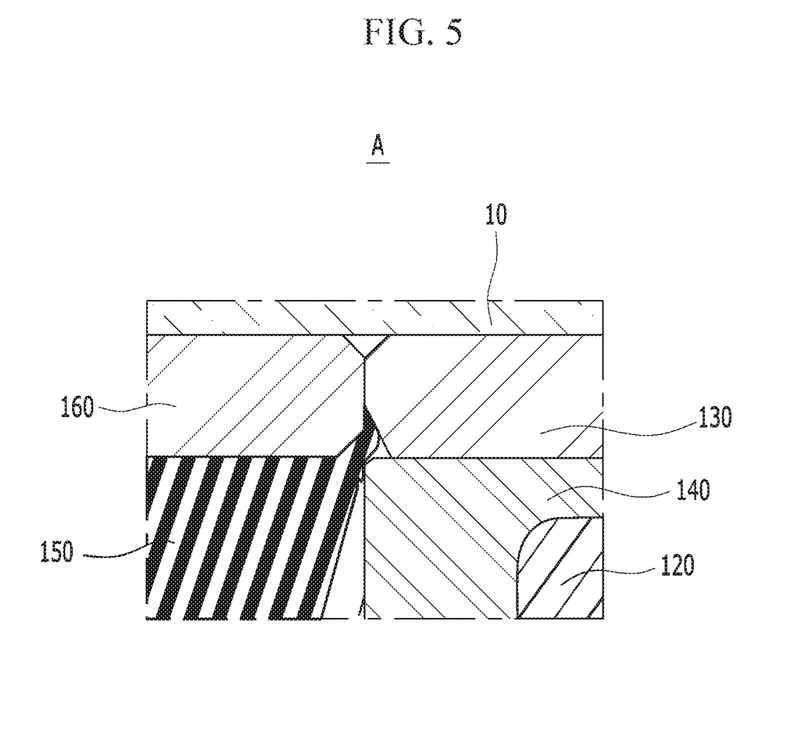
FIG. 5 is an enlarged view of 'A' in FIG. 3.

FIG. 1 is a cross-sectional view of a ball joint according to an exemplary embodiment of the present invention, FIG. 2 is a cross-sectional perspective view of a ball joint according to an exemplary embodiment of the present invention, FIG. 3 is a cross-sectional view for illustrating a ball joint according to an exemplary embodiment of the present invention is mounted, FIG. 4 is a cross-sectional perspective view for illustrating a ball joint according to an exemplary embodiment of the present invention is mounted, and FIG. 5 is an enlarged view of 'A' in FIG. 3.

Referring to FIG. 1 and FIG. 2, a ball joint 100 according to an exemplary embodiment of the present invention is coupled to a shaft member so as to relieve impact due to movement of a shaft member and restore its original position in a case that the shaft member is twisted or rotated. The ball joint 100 includes a stud member 110, a bearing member 120, an outer pipe 130, a seat member 140, rubber ring members 150, and outer ring members 160.

The stud member 110 is a rotation shaft of the ball joint 100 and has a hollow pipe shape. A convex spherical portion 115 is formed on an exterior circumference of the stud member 110. That is, the spherical portion 115 has a curved shape protruding in a radial direction of the stud member 110. The spherical portion 115 may be, but not limited, formed at a middle portion of the stud member 110. Protruded portions 117 protruding in a radial direction may be formed at both end portions of the stud member 110. In addition, the stud member 110 may be, but not limited, made from metal material.

The bearing member 120 is slidably disposed on the stud member 110 and facilitates rotation of the stud member 110. The bearing member 120 is disposed on an exterior circumference of the spherical portion 115 along a circumferential direction, and particularly, on a most convex portion of the exterior circumference of the spherical portion 115. An interior circumference of the bearing member 120 corresponds to the exterior circumference of the spherical portion 115. As illustrated in the drawings, the bearing member 120 may, but be not limited partially enclose the spherical portion 115. That is, the bearing member 120 may enclose an entire surface of the spherical portion 115. The bearing member 120 may be, but not limited, made of plastic material.

The outer pipe 130 encloses the bearing member 120 at an outside of the bearing member 120 so as to protect the bearing member 120. The outer pipe 130 is disposed apart from the bearing member 120 in the radial direction. The seat member 140 is molded between the outer pipe 130 and the bearing member 120 to couple the outer pipe 130 and the bearing member 120. The outer pipe 130 may be, but not limited to, made of metal material.

As described above, the seat member 140 is disposed between the outer pipe 130 and the bearing member 120 and encloses the bearing member 120. For example, inner surfaces of both sides of the seat member 140 encloses both sides of the bearing member 120, and outer surfaces of the both sides of the seat member 140 may lie on the same surfaces as both side surfaces of the outer pipe 130. However, a shape of the seam member 140 is not limited to this. Herein, the inner surface of the seat member 140 means a surface contacting with the bearing member 120, and the outer surface of the seat member 140 means a surface opposite to the inner surface.

As such, the bearing member 120, the seat member 140 and the outer pipe 130 forms a hollow pipe shape about a center axis of the stud member 110, and are connected through the seat member 140 molded between the bearing member 120 and the outer pipe 130.

A pair of rubber ring members 150 are provided at both side portions of an exterior circumference of the stud member 110. The rubber ring members 150 are disposed apart from the spherical portion 115. In further detail, the rubber ring members 150 positioned at both sides of the bearing member 120, the outer pipe 130 and the seat member 140 provided on an exterior circumference of the spherical portion 115 are coupled to the stud member 110. The rubber ring members 150 may be made of resilient material such as rubber material. Therefore, in a case that the shaft member is twisted by external force, the shaft member can restore original portion thereof by reaction force of the rubber ring members 150.

The outer ring members 160 enclose the rubber ring members 150 and are coupled to exterior circumferences of the rubber ring members 150. The outer ring members 160 may be, but not limited to, made of the same material as the outer pipe 130 and be made of, for example metal material.

The rubber ring members 150 are molded into spaces between the stud member 110 and the outer ring members 160. That is, the stud member 110, the bearing member 120 and the outer ring members 160 are connected to each other. Therefore, the rubber ring members 150 are fixed to the stud member 110. On the contrary, the rubber ring members 150 may be bonded respectively to the stud member 110 and the outer ring members 160.

The rubber ring members 150 and the outer ring members 160 are disposed apart from the bearing member 120, the seat member 140 and the outer pipe 130 connected to each other in an axial direction. In addition, the rubber ring members 150 do not contact with the spherical portion 115 of the stud member 110 and are disposed apart from the spherical portion 115. However, the rubber ring members 150, not limited thereto, may contact with the spherical portion 115 of the stud member 110, wherein the rubber ring members 150 and the outer ring members 160 are disposed apart from the bearing member 120, the seat member 140 and the outer pipe 130 in the axial direction. As such, lubrication spaces 170 are formed among the rubber ring members 150 and the outer ring members 160 connected to each other, and the bearing member 120, the seat member 140 and the outer pipe 130 connected to each other.

The ball joint 100 according to the exemplary embodiment of the present invention is mounted at an arm member 10 as follows.

Referring to FIG. 3 and FIG. 4, the ball joint 100 is fitted onto the arm member 10 of hollow pipe shape and is coupled to a vehicle body. In further detail, the spherical portion 115 of the stud member 110, the bearing member 120, the seat member 140, and the outer pipe 130 are fitted onto a middle portion of the arm member.

A distance in the axial direction between the pair of rubber ring members 150 or the pair of outer ring members 160 provided at both end portions of the stud member 110 may be longer than a length of the arm member 10 in the axial direction. Therefore, each rubber ring member 150 and each outer ring member 160 are pushed toward the outer pipe 130 such that each outer ring member 160 contacts with the outer pipe 130. After that, the outer ring members 160 and the outer pipe 130 are interference-fitted onto the arm member 10. On the contrary, the outer pipe 130 is interference-fitted onto the arm member 10 and the outer ring members 160 are interference-fitted onto the arm member 10 preliminarily. After that, the outer ring members 160 are pushed toward the outer pipe 130 and are contacted to the outer pipe 130.

Therefore, the rubber ring members 150 and the outer ring members 160 are not perpendicular to the exterior circumference of the stud member 110 in radial direction and are fitted onto the arm slanted toward the outer pipe 130. At this time, a side surface of each outer ring member 160 contacts with a side surface of the outer pipe 130.

Prior to the rubber ring members 150 and the outer ring members 160 are interference-fitted onto the arm member 10, a user supplies lubricants into the lubrication spaces 170 among the rubber ring members 150 and the outer ring members 160 connected to each other, and the bearing member 120, the seat member 140 and the outer pipe 130 connected to each other. The lubricant may be a grease. The lubricants cause the bearing member 120 to slide smoothly on the spherical portion 115 of stud member 110 along the exterior circumference thereof.

Referring to FIG. 5, each rubber ring member 150 is configured to enclose a circumference of a side of each outer ring member 160. Particularly, each rubber ring member 150 is configured to enclose the circumference of the side of each outer ring member 160 facing the outer pipe 130 such that the lubricants are prevented from flowing out when the outer ring members 160 and the outer pipe 130 are fitted onto the arm member and are contacted with each other.

As shown in FIG. 5 the outer ring members 160 and the outer pipe 130 are so provided that sealing spaces are formed between inner circumferences of the sides of the outer ring member 160 and an inner circumference of the side of the outer pipe 130. In addition, the rubber ring members 150 are molded to enclose the inner circumferences of the sides of the outer ring member 160 and fill the sealing spaces.

In addition, as shown in FIG. 5, the outer ring member 160 and the outer pipe 130 have the same thickness. However, the outer ring members 160, the outer pipe 130 and the rubber ring members are not limited to the above-mentioned features. A portion of a side of the outer ring member 160 and a portion of a side of the outer pipe 130 are contacted to each other along a circumferential direction, and mom-contacting regions are enclosed by the rubber member such that a space therebetween are sealed.

The ball joint 100 having the above-mentioned features may have high rigidity in a radial direction by the stud member 110, the bearing member 120, and the outer pipe 130, and may also exert the same restoring force as the rubber bushing by the rubber ring members 150 provided at both end portions of the stud member 110.

In addition, the ball joint 100 according to the exemplary embodiment of the present invention can achieve sealing using the rubber ring members 150 without an additional sealing member for preventing leakage of the lubricant.

Figure 6:
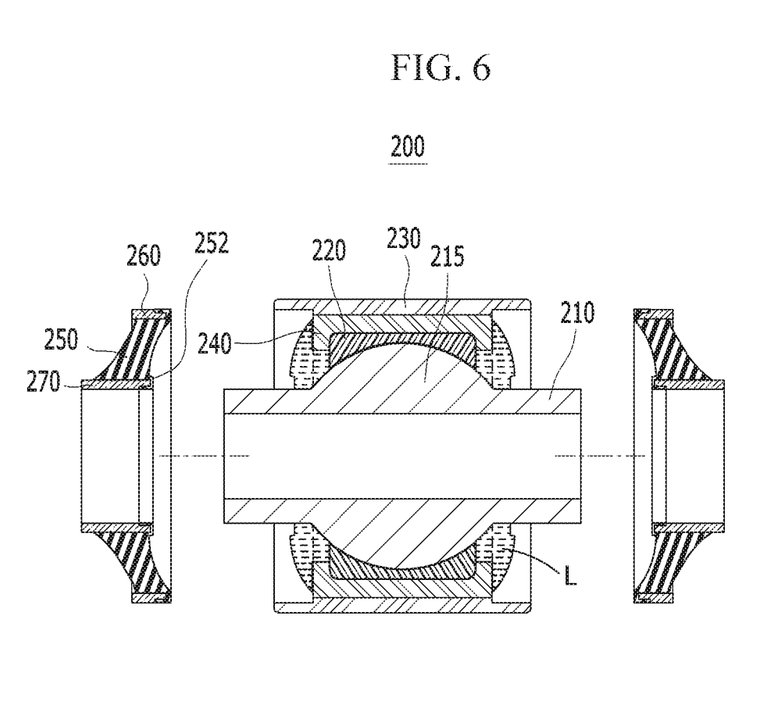
FIG. 6 is an exploded view of a ball joint according to an exemplary embodiment of the present invention.
Figure 7:
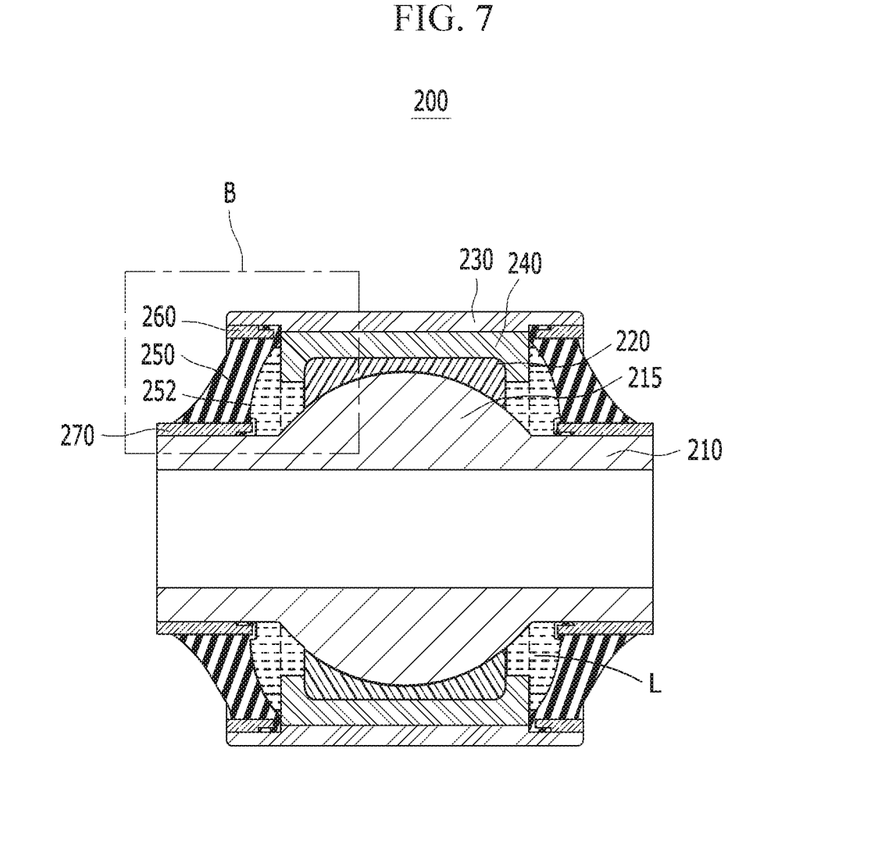
FIG. 7 is a cross-sectional view of a ball joint according to an exemplary embodiment of the present invention.
Figure 8:
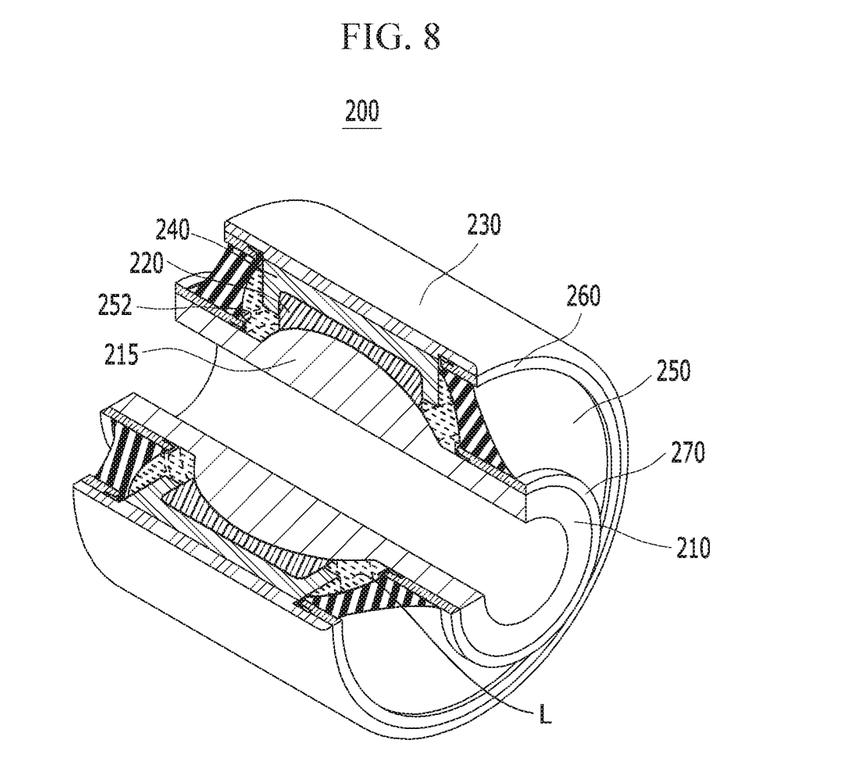
FIG. 8 is a cross-sectional perspective view of a ball joint according to an exemplary embodiment of the present invention.
Figure 9:
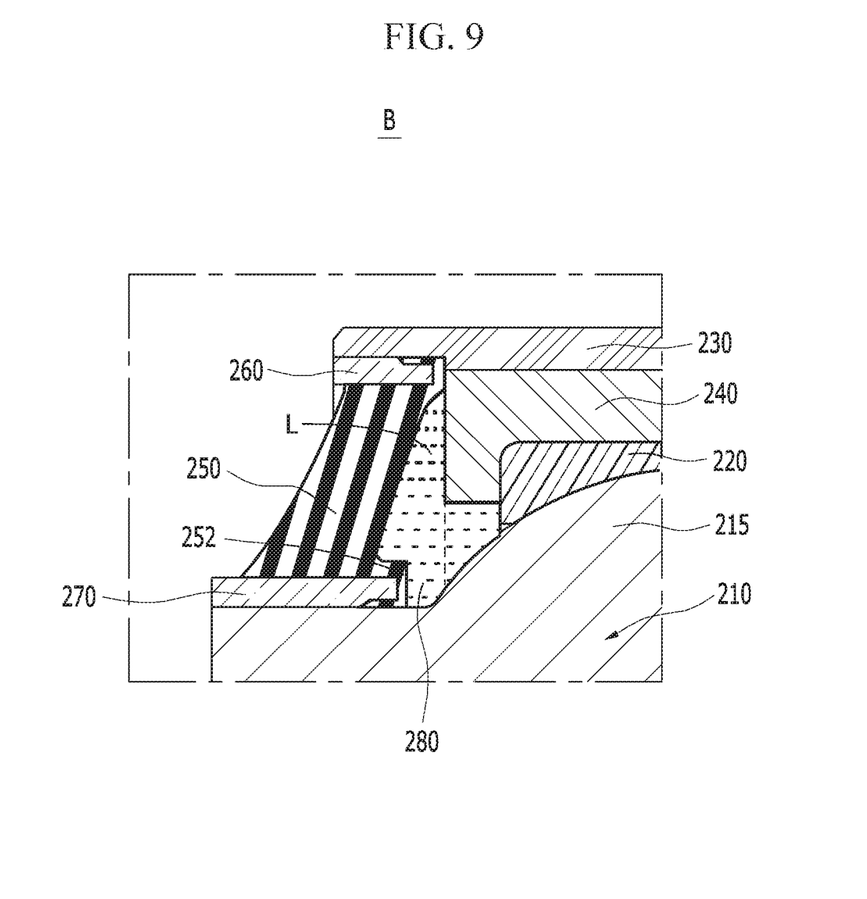
FIG. 9 is an enlarged view of 'B' in FIG. 7.

FIG. 6 is an exploded view of a ball joint according to an exemplary embodiment of the present invention, FIG. 7 is a cross-sectional view of a ball joint according to an exemplary embodiment of the present invention, FIG. 8 is a cross-sectional perspective view of a ball joint according to an exemplary embodiment of the present invention, and FIG. 9 is an enlarged view of 'B' in FIG. 7.

Referring to FIG. 6 to FIG. 8, the ball joint 200 according to an exemplary embodiment of the present invention includes a stud member 210, a bearing member 220, an outer pipe 230, a seat member 240, rubber ring members 250, outer ring members 260, and inner ring members 270. In the ball joint 200, different from the ball joint 100 shown in FIG. 1 to FIG. 5, the rubber ring members 250 are not integrally formed with but are separately formed from the stud member 210.

Since the stud member, the bearing member, the seat member and the outer pipe of ball joint 200 are the same as or similar to those 110, 120, 140, and 130 of the ball joint 100 shown in FIG. 1 to FIG. 5, descriptions about the stud member 210, the bearing member 220, the seat member 240 and the outer pipe 230 will be substituted by the above description.

However, the stud member 210 is different from the stud member 110 shown in FIG. 1 to FIG. 5, and the protruded portions 117 are not formed at both ends of the stud member 210.

The outer pipe 230, different from the outer pipe 130 shown in FIG. 1 to FIG. 5, is shorter than the stud member 210 and is longer than the spherical portion 215 in the axial direction. However, the length of the outer pipe is not limited thereto.

As shown in FIG. 6, the rubber ring members 250 are fitted onto and coupled to the stud member 210. At this time, each inner ring member 270 is coupled to an interior circumference of each rubber ring member 250, and each outer ring member 260 is coupled to an exterior circumference of each rubber ring member 250. That is, the rubber ring member 250 may be formed between the inner ring member 270 and the outer ring member 260 through injection molding. However, manufacturing method of the rubber ring is not limited to this. The rubber ring member 250 may be bonded to the inner ring member 270 and the outer ring member 260.

The inner ring member 270, the rubber ring member 250 and the outer ring member 260 connected to each other are interference-fitted between the stud member 210 and the outer pipe 230. Therefore, the outer ring member 260 contacts with an interior circumference of the outer pipe 230 and the inner ring member 270 contacts with an exterior circumference of the stud member 210.

Lubricant L is supplied around the bearing member 220 before the inner ring member 270, the rubber ring member 250 and the outer ring member 260 connected to each other are interference-fitted. An end of an internal circumference of the rubber ring member 250 coupled to the inner ring member 270 is disposed apart from the spherical portion 215, but an end of an external circumference of the rubber ring member 250 coupled to the outer ring member 260 contacts with the outer pipe 230 and/or the seat member 240. In this way, a space for flowing the lubricant L therein is provided.

Therefore, the rubber ring member 250 may be molded to be slanted with respect to the exterior circumference of the stud member 210 in the radial direction. That is, a portion of the rubber ring member coupled to the outer ring member 260 is formed to be slanted toward the outer pipe 230 further than a portion of the rubber ring member coupled to the inner ring member 270. However, the rubber ring member 250 is not limited to this. The rubber ring member may be formed vertically to the exterior circumference of the stud member 210, and the outer ring member 260 is interference-fitted onto the interior circumference of the outer pipe 230 to contact with the outer pipe 230 when the rubber ring member 250 is interference-fitted between the stud member 210 and the outer pipe 230.

Referring to FIG. 9, the rubber ring member 250 is configured to enclose a side of an external circumference of the inner ring member 270 and a side of an internal circumference of the outer ring member 260. Particularly, the rubber ring member 250 encloses the side of an internal circumference of the outer ring member 260 facing the outer pipe 230, and encloses the side of an external circumference of the inner ring member 270 facing the spherical portion 215. This is because leakage of the lubricant L to the outside is prevented.

A stopper 252 protruded from an inner end of the rubber ring member 250 coupled to the inner ring member 270 is formed at the rubber ring member 250. The stopper 252 restricts rolling angle when the bearing member 220 is rolled along the spherical portion 215 due to twist of the shaft member. That is, the bearing member 220 slanted toward the rubber ring member 250 is blocked by the stopper 252 protruded from the rubber ring member 250, and is not moved and is stopped.

The inner ring member 270 and the outer ring member 260 are made of material having high rigidity so as to be coupled to the stud member 210 or the outer pipe 230 strongly and not to be deformed by external force. For example, the inner ring member 270 and the outer ring member 260 may be, but not limited, made of metal material.

The ball joint 200 according to an exemplary embodiment of the present invention, the same as the ball joint 100 shown in FIG. 1 to FIG. 5, has high rigidity in the radial direction by the stud member 210, the bearing member 220 and the outer pipe 230, and has restoring force like a rubber bushing by the rubber ring members 250 provided at both end portions of the stud member 210.

In addition, the ball joint 200 according to an exemplary embodiment of the present invention may achieve sealing without an additional sealing member for preventing leakage of the lubricant L to the outside.

In addition, since the rubber ring members 250 are not directly formed on the stud member 210 but are interference-fitted between the stud member 210 and the outer pipe 230, manufacturing of the components of the ball joint 200 may be easy.

In addition, rolling angle of the bearing member 220 due to twist of the shaft member can be controlled.

The invention claimed is:

1. A ball joint comprising:
a stud member having a spherical portion formed to be convex along an exterior circumference;
a bearing member seated on an exterior circumference of the spherical portion and facilitating rotation of the stud member;
an outer pipe provided at an outside of the bearing member;
a seat member provided between and coupling the bearing member and the outer pipe;
a pair of rubber ring members provided respectively at both sides of the spherical portion on the exterior circumference of the stud member; and
a pair of outer ring members, each of the pair of outer ring members being coupled on an exterior circumference of each rubber ring member, wherein:
the rubber ring members are configured to cover sides of the outer ring members facing the outer pipe,
the rubber ring members provide an elastic force for restoring the stud member to its original position in a case that the stud member is twisted or rotated relative to the bearing member,
the seat member is molded between the outer pipe and the bearing member to couple the outer pipe and the bearing member, and
the rubber ring members are molded into spaces between the stud member and the outer ring members so that the stud member and the outer ring members are connected to each other.

2. The ball joint of claim 1, wherein the rubber ring members are fixedly coupled to the stud member.

3. The ball joint of claim 1, wherein the rubber ring members are disposed apart from the seat member in an axial direction.

4. The ball joint of claim 1, wherein the rubber ring members are disposed apart from the seat member and the spherical portion in an axial direction.

5. The ball joint of claim 1, wherein the rubber ring members are configured to cover interior circumferential portions of sides of the outer ring members.

6. A ball joint comprising:
a stud member having a spherical portion formed to be convex along an exterior circumference;
a bearing member seated on an exterior circumference of the spherical portion and facilitating rotation of the stud member;
an outer pipe provided at an outside of the bearing member;
a seat member provided between and coupling the bearing member and the outer pipe;
a pair of rubber ring members provided respectively at both sides of the spherical portion on the exterior circumference of the stud member;
a pair of outer ring members, each of the pair of outer ring members being coupled on an exterior circumference of each rubber ring member, and
inner ring members, wherein each of the inner ring members is coupled on an interior circumference of each rubber ring member, wherein the rubber ring members are provided separately from the stud member and are fitted on the stud member, wherein:

the rubber ring members are configured to cover sides of the outer ring members facing the outer pipe, the rubber ring members provide an elastic force for restoring the stud member to its original position in a case that the stud member is twisted or rotated relative to the bearing member, the seat member is molded between the outer pipe and the bearing member to couple the outer pipe and the bearing member, and the rubber ring members are formed between the inner ring member and the outer ring member through injection molding so that the inner ring members and the outer ring members are connected to each other.

7. The ball joint of claim 6, wherein a length of the outer pipe is longer than that of the bearing member.

8. The ball joint of claim 6, wherein the rubber ring members are interference-fitted between the stud member and the outer pipe.

9. The ball joint of claim 8, wherein a lubricant fills among the rubber ring members, the seat member, the bearing member and the stud member.

10. The ball joint of claim 6, wherein the rubber ring members are configured to cover sides of the inner ring members facing the spherical portion.

11. The ball joint of claim 6, wherein the rubber ring members are disposed apart from the spherical portion.

12. The ball joint of claim 6, further comprising stoppers protruded from ends of interior circumferences of the rubber ring members facing the spherical portion.

* * * * *